United States Patent
Liang et al.

(10) Patent No.: US 12,194,385 B2
(45) Date of Patent: Jan. 14, 2025

(54) METHOD AND APPARATUS FOR DISPLAYING VIRTUAL PROP, STORAGE MEDIUM, AND ELECTRONIC DEVICE

(71) Applicant: Tencent Technology (Shenzhen) Company Limited, Shenzhen (CN)

(72) Inventors: Chao Liang, Shenzhen (CN); Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 257 days.

(21) Appl. No.: 17/581,180

(22) Filed: Jan. 21, 2022

(65) Prior Publication Data

US 2022/0143507 A1     May 12, 2022

Related U.S. Application Data

(63) Continuation of application No. PCT/CN2020/125940, filed on Nov. 2, 2020.

(30) Foreign Application Priority Data

Jan. 15, 2020 (CN) .......................... 202010042509.8

(51) Int. Cl.
    *A63F 13/57*        (2014.01)
    *G06F 3/0488*      (2022.01)
    (Continued)

(52) U.S. Cl.
    CPC ............ *A63F 13/57* (2014.09); *G06F 3/0488* (2013.01); *G06T 7/70* (2017.01); *G06V 20/50* (2022.01); *A63F 2300/6653* (2013.01)

(58) Field of Classification Search
CPC ... A63F 13/52; A63F 13/57; A63F 2300/6653
See application file for complete search history.

(56) References Cited

U.S. PATENT DOCUMENTS

| 10,290,175 B2 | 5/2019 | Castro et al. |
| 11,471,768 B2 | 10/2022 | Chan et al. |

(Continued)

FOREIGN PATENT DOCUMENTS

| CN | 108854070 A | 11/2018 |
| CN | 109173258 A | 1/2019 |

(Continued)

OTHER PUBLICATIONS

Adigames, "Batman Arkham Origins | Detective Mode," Oct. 29, 2013, available at https://www.youtube.com/watch?v=SJmR_f0X-zw&t=1s (Year: 2013).*

(Continued)

*Primary Examiner* — Jay Trent Liddle
(74) *Attorney, Agent, or Firm* — Crowell & Moring LLP

(57) ABSTRACT

A method, apparatus, and a storage medium for displaying a virtual prop includes: displaying a screen in which a target virtual operation object is located in a target application; detecting a virtual prop of a target type within a visual angle range of the target virtual operation object in response to the target virtual operation object being configured with a target virtual skill, where the target virtual skill allows the target virtual operation object to see the virtual prop of the target type through a virtual obstacle; and displaying perspective information of the target virtual prop in the target application in response to the target virtual prop of the target type being detected within the visual angle range of the target virtual operation object.

17 Claims, 5 Drawing Sheets

(51) Int. Cl.
*G06T 7/70* (2017.01)
*G06V 20/50* (2022.01)

(56) References Cited

U.S. PATENT DOCUMENTS

| | | | |
|---|---|---|---|
| 2006/0046844 A1* | 3/2006 | Kaneko | A63F 13/40 463/32 |
| 2007/0218965 A1* | 9/2007 | Tilston | A63F 13/45 463/2 |
| 2007/0218966 A1* | 9/2007 | Tilston | A63F 13/5378 463/5 |
| 2012/0257021 A1 | 10/2012 | Kira et al. | |
| 2017/0354885 A1 | 12/2017 | Kitazono et al. | |
| 2017/0368460 A1* | 12/2017 | Ceraldi | A63F 13/5252 |
| 2019/0192967 A1* | 6/2019 | Ogasawara | A63F 13/25 |
| 2019/0329133 A1* | 10/2019 | Okamura | A63F 13/52 |
| 2020/0012340 A1 | 1/2020 | Lyren et al. | |
| 2020/0206623 A1* | 7/2020 | Nakano | A63F 13/525 |
| 2020/0391110 A1* | 12/2020 | Morishita | A63F 13/56 |

FOREIGN PATENT DOCUMENTS

| | | | |
|---|---|---|---|
| CN | 109876438 A | 6/2019 | |
| CN | 110334027 A | 10/2019 | |
| CN | 111265861 A | 6/2020 | |
| WO | WO 2018/131035 A1 | 7/2018 | |

OTHER PUBLICATIONS

JStarnum Lander, BATMANtm: Arkham Knight—Searching for Barbara (Detective Mode), Aug. 10, 2015, available at https://www.youtube.com/watch?v=yXMKS9iNGD4 (Year: 2015).*
Slogo, How To X-Ray Vision Through Anything! (Fortnite Battle Royale), Jan. 5, 2018, available at https://www.youtube.com/watch?v=6TvY2pJE5Pg (Year: 2018).*
International Search Report and Written Opinion for PCT/CN2020/125940 mailed Jan. 20, 2021 including translation of Search Report (10 pages).
Office Action issued in Chinese Application 2020100425098 on Dec. 25, 2020, 9 pages.
Screen captures from YouTube video clip entitled "Rainbow Six Siege: Chimera Operators Gameplay and Starter Tips," 5 pages, uploaded on Feb. 17, 2018 by user "Ubisoft North America". Retrieved from Internet: < https://www.youtube.com/watch?v=zXV4Sgeyr2c>.
Screen captures from YouTube video clip entitled "How Does the Maximum Power Look: YRDEN, QUEN, IGNI, AKSJI, AARD, in Witcher 3", 1 page uploaded on Sep. 23, 2017 by user "NEWIIL". Retrieved from Internet: <https://www.youtube.com/watch?v=5iMNzj0p6lg>.
Search Report and Written Opinion for Singapore Patent Application 11202202362Q, Nov. 11, 2024, 8 pages.

* cited by examiner

METHOD AND APPARATUS FOR DISPLAYING VIRTUAL PROP, STORAGE MEDIUM, AND ELECTRONIC DEVICE

RELATED APPLICATION

This application is a continuation of International Patent Application No. PCT/CN2020/125940, filed Nov. 2, 2020, which claims priority to Chinese Patent Application No. 202010042509.8, entitled "METHOD AND APPARATUS FOR DISPLAYING VIRTUAL PROP, STORAGE MEDIUM, AND ELECTRONIC DEVICE" filed with the China National Intellectual Property Administration on Jan. 15, 2020. The contents of International Patent Application No. PCT/CN2020/125940 and Chinese Patent Application No. 202010042509.8 are each incorporated by reference in their entirety.

FIELD OF THE TECHNOLOGY

This application relates to the field of games, and in particular, to a method and an apparatus for displaying a virtual prop, a storage medium, and an electronic device.

BACKGROUND OF THE DISCLOSURE

Nowadays, more users are participating in network games, and as the maps of map-based games are made bigger, the problem of finding things or targets is bigger. Many times, players cannot learn exactly where they need to go to find targets or find what they want. Consequently, players waste more time in finding targets, further reducing the players' game experience.

SUMMARY

Embodiments of this application provide a method and an apparatus for displaying a virtual prop, a storage medium, and an electronic device, to resolve at least the technical problem that the target virtual operation object takes a relatively long time to find the target virtual prop in the related art.

According to one aspect of the embodiments of this application, a method for displaying a virtual prop is provided, applicable to an electronic device, and including:

displaying a screen in which a target virtual operation object is located in a target application;

detecting a virtual prop of a target type within a visual angle range of the target virtual operation object in response to the target virtual operation object being configured with a target virtual skill, wherein the target virtual skill allows the target virtual operation object to see the virtual prop of the target type through a virtual obstacle; and displaying perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop.

According to another aspect of the embodiments of this application, an apparatus for displaying a virtual prop is further provided, including:

a first display unit, configured to display a screen in which a target virtual operation object is located in a target application;

a detection unit, configured to detect a virtual prop of a target type within a visual angle range of the target virtual operation object in response to the target virtual operation object being configured with a target virtual skill, wherein the target virtual skill is used for allowing the target virtual operation object to see the virtual prop of the target type through a virtual obstacle;

a second display unit, configured to display perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop.

According to still another aspect of the embodiments of this application, a computer-readable storage medium is further provided, storing a computer program, the computer program being set to perform, when run, the foregoing method for displaying a virtual prop.

According to yet another aspect of the embodiments of this application, an electronic device is further provided, including a memory, a processor, and a computer program that is stored in the memory and executable on the processor, the processor performing the foregoing method for displaying a virtual prop through the computer program.

In the embodiments of this application, a screen in which a target virtual operation object is located is displayed in a target application; a target virtual prop of a target type is detected within a visual angle range of the target virtual operation object in response to the target virtual operation object being configured with a target virtual skill, wherein the target virtual skill allows the target virtual operation object to see the virtual prop of the target type through a virtual obstacle; and perspective information of the target virtual prop is displayed in the target application in response to the target virtual prop being detected within the visual angle range of the target virtual operation object, a distance between the target virtual operation object and the target virtual prop is less than a predetermined threshold, and at least one target virtual obstacle exists between the target virtual operation object and the target virtual prop, to avoid a failure in seeing the target virtual prop behind the virtual obstacle in time due to the blocking of the virtual obstacle, so that the target virtual operation object can perspectively see the virtual prop of the target type that is at a predetermined distance from itself and that is blocked by the virtual obstacle. This, in turn, can facilitate the target virtual operation object quickly finding the target virtual prop, which can avoid blindly finding the target virtual prop, and can further reduce the amount of data interaction, thereby improving the operation speed of the target application.

BRIEF DESCRIPTION OF THE DRAWINGS

Accompanying drawings described herein are used for providing further understanding about the embodiments of this application and form a part of this application. Exemplary embodiments of this application and descriptions thereof are used for explaining the embodiments of this application, and do not constitute an inappropriate limit on the embodiments of this application. In the drawings.

DESCRIPTION OF EMBODIMENTS

Figure 1:
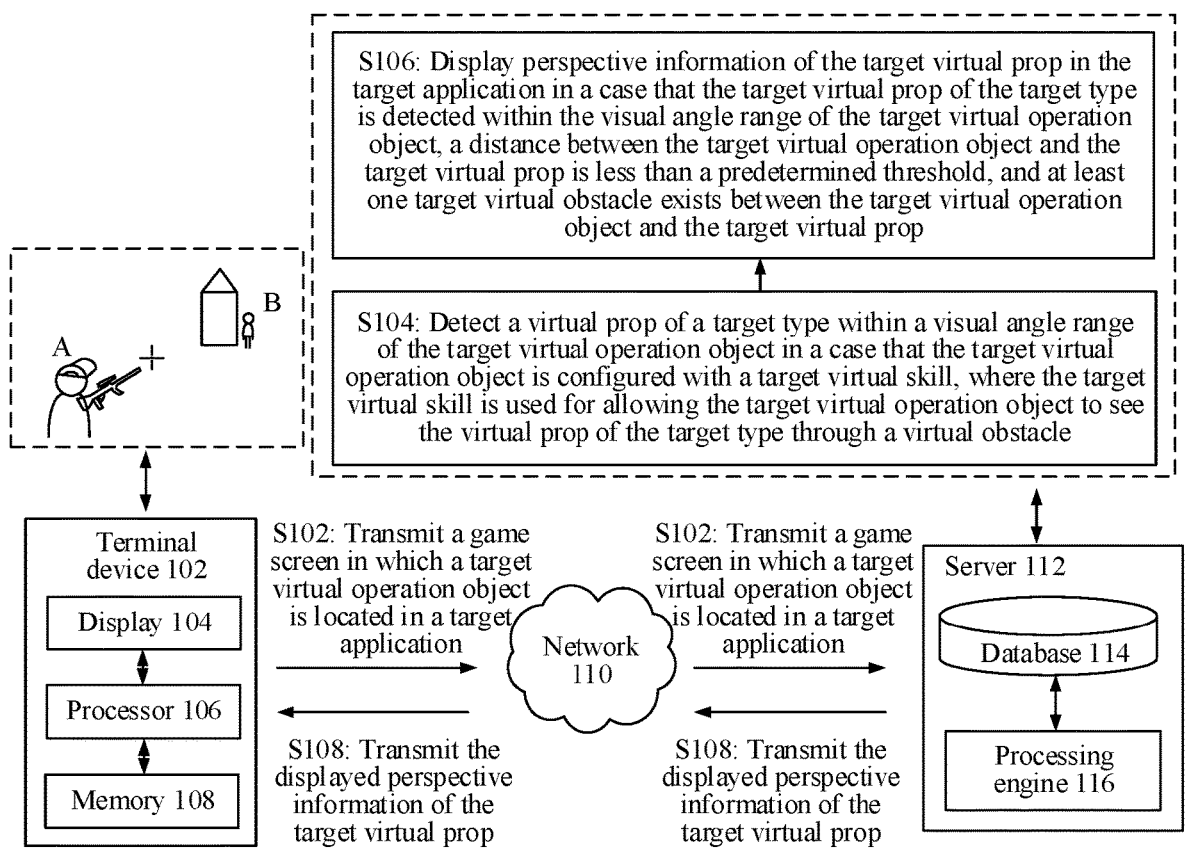
FIG. 1 is a schematic diagram of an environment in which a method for displaying a virtual prop is applicable according to an embodiment of this application.

To make a person skilled in the art better understand the embodiments of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

The terms "first" and "second" in the specification and claims of this application and the foregoing accompanying drawings are used to distinguish similar objects, and are not necessarily used to describe a specific order or sequence. It is to be understood that the data termed in such a way are interchangeable in appropriate circumstances, so that the embodiments of this application described herein can be implemented in orders other than the order illustrated or described herein. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to one aspect of the embodiments of this application, a method for displaying a virtual prop is provided. The method for displaying a virtual prop may be, but is not limited to, applicable to a system for displaying a virtual prop in a hardware environment shown in FIG. 1. The system for displaying a virtual prop may include, but is not limited to, a terminal device 102, a network 110, and a server 112. An application client is running in the terminal device 102, and the application client may be a game client configured to control a target virtual character to complete a game task in a game scene. In some embodiments, the application client may be a virtual reality application client, an augmented reality application client, or the like.

The terminal device 102 may include, but is not limited to: a human-computer interaction screen 104, a processor 106, and a memory 108. The human-computer interaction screen 104 is configured to obtain a human-computer interaction instruction through a human-computer interaction interface, and is further used for presenting an application screen of a running application, such as a game screen of a running game application. The processor 106 is configured to control the target virtual character to perform a specified operation to complete a game task in response to the human-computer interaction instruction. The memory 108 is configured to store attribute information of a target virtual operation object and attribute information of a virtual obstacle. The server 112 herein may include, but is not limited to: a database 114 and a processing engine 116. The processing engine 116 is configured to invoke a target virtual prop of a target type detected within a visual angle range of the target virtual operation object stored in the database 114, and a distance between the target virtual operation object and the target virtual prop, and display perspective information of the target virtual prop in the target application in response to the distance between the target virtual operation object and the target virtual prop being less than a predetermined threshold, and at least one target virtual obstacle exists between the target virtual operation object and the target virtual prop, to avoid a failure in seeing the target virtual prop behind the virtual obstacle in time due to the blocking of the virtual obstacle, so that the target virtual operation object can perspectively see the target virtual prop that is at a predetermined distance from itself and that is blocked by the virtual obstacle. This, in turn, facilitates the target virtual operation object to quickly find the target virtual prop, thereby resolving the technical problem that the target virtual operation object takes a relatively long time to find the target virtual prop in the related art.

The server 112 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

An example in which a target application is a game application is used to described a method for displaying a prop, and the method for displaying a prop is implemented in the following steps: displaying an interaction interface of a game client running a game task (FIG. 1 shows a shooting game, a target virtual character A is sniping a target object B in the distance) in the human-computer interaction screen 104 of the terminal device 102. As in steps S102 to S108, the terminal device 102 obtains a game screen in which a target virtual operation object is located in a target game application, and transmits the game screen to the server 112 through the network 110. The server 112 detects a target virtual prop of a target type within a visual angle range of the target virtual operation object in response to the target virtual operation object being configured with a target virtual skill, where the target virtual skill allows the target virtual operation object to see the target virtual prop of the target type through a virtual obstacle; and displays perspective information of the target virtual prop in the target game application in response to the target virtual prop being detected within the visual angle range of the target virtual operation object, a distance between the target virtual operation object and the target virtual prop is less than a predetermined threshold, and at least one target virtual obstacle exists between the target virtual operation object and the target virtual prop, and returns the determined perspective information of the target virtual prop to the terminal device 102.

After receiving the perspective information of the target virtual prop transmitted by the server 114, the terminal device 102 displays the perspective information of the target virtual prop in the target game application, to avoid a failure in seeing the target virtual prop behind the virtual obstacle in time due to the blocking of the virtual obstacle, so that the target virtual operation object can perspectively see the target virtual prop that is at a predetermined distance from itself and that is blocked by the virtual obstacle. This, in turn, facilitates the target virtual operation object to quickly find the target virtual prop, thereby resolving the technical problem that the target virtual operation object takes a relatively long time to find the target virtual prop in the related art. In addition, the terminal device 102 can quickly find the target virtual prop based on the perspective information of the target virtual prop transmitted by the server 114, to reduce the amount of data interaction between the terminal device 102 and the server 114, which not only improves the operation speed of the target application, but also reduces the requirement of the target application for the communication bandwidth.

In this embodiment, the method for displaying a virtual prop may be, but is not limited to, applicable to the server 114 to assist the application client in displaying the detected virtual prop of the target type. The application client may be, but is not limited to, run in the terminal device 102, and the terminal device 102 may be, but is not limited to, a terminal device that can run an application client, such as a mobile phone, a tablet computer, a notebook computer, a PC, or the like. The server 114 and the terminal device 102 may perform, but not limited to, data interaction with each other through a network, and the network may include, but not limited to, a wireless network or a wired network. The wireless network includes: Bluetooth, Wi-Fi, and another network implementing wireless communication. The wired network may include, but not limited to: a wide area network, a metropolitan area network, and a local area network. The foregoing is merely an example, and this is not limited in this embodiment.

Figure 2:
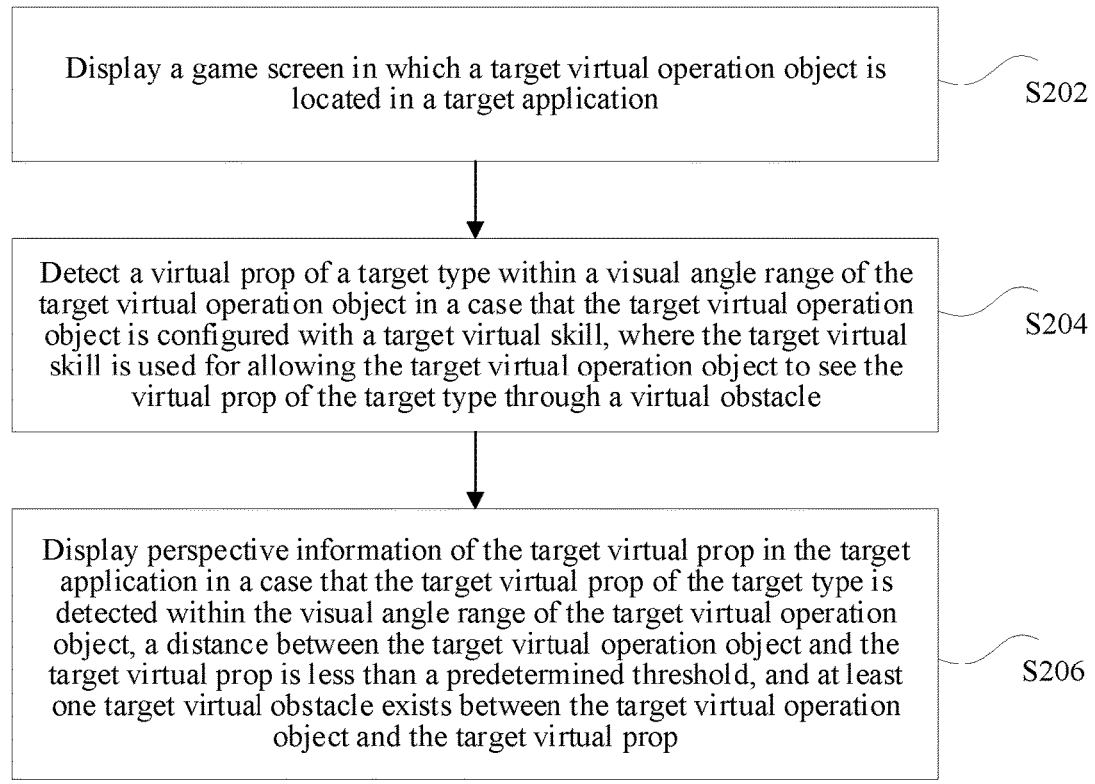
FIG. 2 is a flowchart of a method for displaying a virtual prop according to an embodiment of this application.

As shown in FIG. 2, the method for displaying a virtual prop includes:

Step S202: Display a screen in which a target virtual operation object is located in a target application.

The target application herein may be a game application, a virtual reality application, an augmented reality application or the like. In this embodiment of this application, an example in which the target application is a game application is used for description.

Step S204: Detect a virtual prop of a target type within a visual angle range of the target virtual operation object in a case that the target virtual operation object is configured with a target virtual skill, where the target virtual skill is used for allowing the target virtual operation object to see the virtual prop of the target type through a virtual obstacle.

Step S206: Display perspective information of the target virtual prop in the target application in response to the target virtual prop being detected within the visual angle range of the target virtual operation object, a distance between the target virtual operation object and the target virtual prop is less than a predetermined threshold, and at least one target virtual obstacle exists between the target virtual operation object and the target virtual prop.

In this embodiment, the method for displaying a virtual prop may be, but is not limited to, applicable to a game application in which a realistic game scene is constructed through many virtual obstacles, such as a long-range shooting game application, a racing game application, or the like.

A movement time of the target virtual operation object can be shortened by controlling the target virtual operation object to ride on a vehicle in these game applications. The game application may be a multiplayer online battle arena (MOBA) game or a single-player game (SPG). The type of the game application may include, but is not limited to, at least one of a two-dimensional (2D) game application, a three-dimensional (3D) game application, a virtual reality (VR) game application, an augmented reality (AR) game application, or a mixed reality (MR) game application. The foregoing is merely an example, and this embodiment is not limited thereto.

In this embodiment, the target virtual operation object may include, but is not limited to, selecting a target virtual skill before a combat (e.g., a game) is started, and selecting the target virtual skill via a target virtual skill button in the game interface within a predetermined time after a combat (e.g., a game) is started, where the target virtual skill may allow the target virtual operation object to perspectively see the virtual prop of the target type in the distance and blocked by the virtual obstacle.

The virtual prop of the target type may include, but not limited to, a virtual prop of a gun type, such as a virtual pistol, a virtual rifle, or the like, and may further include a virtual prop of a vehicle type, such as a virtual car, a virtual flight, a virtual boat, or the like. Further, the virtual prop of the target type may include one of the following types: a virtual prop for shooting or a virtual prop for vehicles and tools.

The at least one target virtual obstacle may include, but not limited to, a house, a mountain, a tree or the like that blocks the view of the target virtual operation object.

In this embodiment, location identification information may also be displayed in the area where the perspective information of the target virtual prop is displayed, and the location identification information is used for indicating a straight-line distance of the current location of the target virtual operation object from the target virtual operation object.

Figure 3:
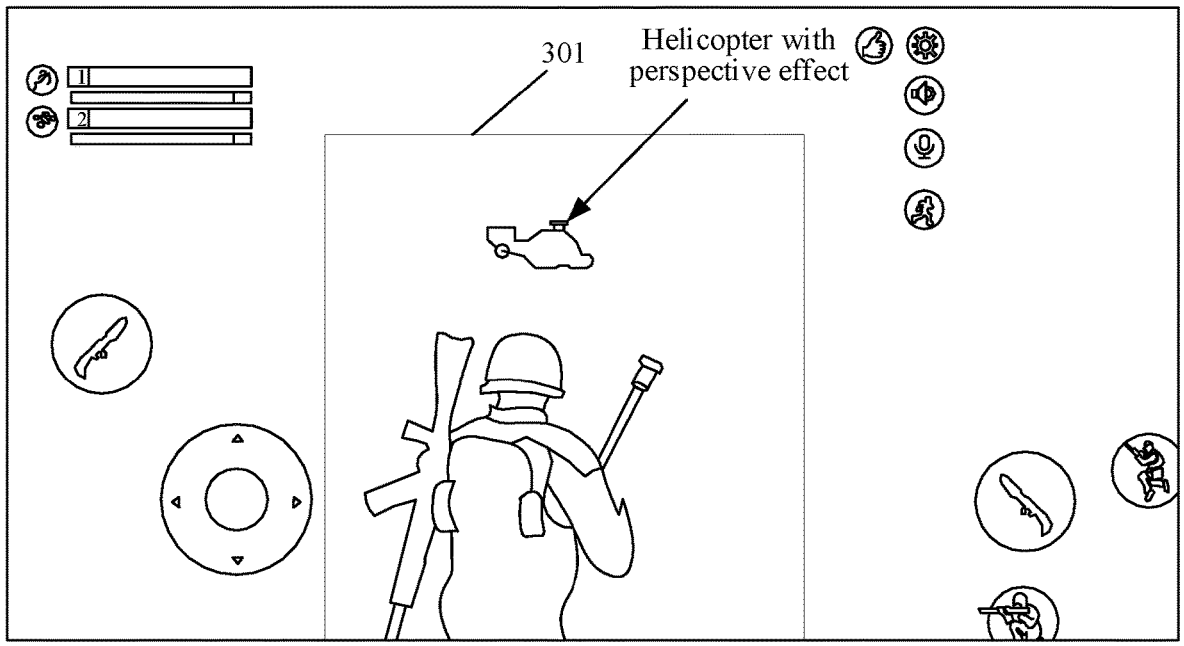
FIG. 3 is a schematic diagram of displaying perspective information of a target prop on a target virtual obstacle according to an embodiment of this application.

In the related art, in event that the target virtual operation object is located in a house in the game, and the view of the target virtual operation object is blocked by a wall, the target virtual operation object cannot see a helicopter 50 meters away from the target virtual operation object. In the solution provided by the embodiments of this application, the target virtual operation object can see perspective information of the helicopter of 50 meters away from the target virtual operation object through the wall. FIG. 3 is a schematic diagram of displaying perspective information of a target prop on a target virtual obstacle, and the perspective information may include, but not limited to, contour information of the target virtual prop.

Even if a plurality of virtual props may exist between the target virtual operation object and the target virtual prop, the target virtual operation object in the embodiments of this application can still see the target virtual prop in the distance.

In this embodiment, the displaying perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop includes:

displaying the perspective information of the target virtual prop in the target application in response to the target virtual prop being detected within the visual angle range of the target virtual operation object, the distance between the target virtual operation object and the target virtual prop is less than the predetermined threshold, and a plurality of virtual obstacles exist between the target virtual operation object and the target virtual prop, where the at least one target virtual obstacle includes the plurality of virtual obstacles.

In this embodiment, the displaying perspective information of a target virtual prop in the target application includes: displaying a contour of the target virtual prop in the target application, where the perspective information includes the contour of the target virtual prop, and a dimension of the contour is negatively correlated with the distance.

For example, a 1:4 contour dimension with a whole solid model of the target virtual prop is displayed in event that the target virtual operation object is 50 meters away from the target virtual prop, and a 1:2 contour dimension with a whole solid model of the target virtual prop is displayed in event that the target virtual operation object is 30 meters away from the target virtual prop.

As long as the object is within a predetermined distance and there is an obstacle in the way, there is a perspective effect. A player can easily see where is an available vehicle in this way, and the most important thing is that the perspective function is only related to the distance and has nothing to do with layers of the obstacle. That is, no matter how many obstacles are in the player's visual angle range, the perspective effect is not affected.

In the embodiments of this application, a screen in which a target virtual operation object is located is displayed in a target application; a virtual prop of a target type is detected within a visual angle range of the target virtual operation object in response to the target virtual operation object being configured with a target virtual skill, where the target virtual skill is used for allowing the target virtual operation object to see the virtual prop of the target type through a virtual obstacle; and perspective information of the target virtual prop is displayed in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop, to avoid a failure in seeing the target virtual prop behind the virtual obstacle in time due to the blocking of the virtual obstacle, so that the target virtual operation object perspectively can see the virtual prop of the target type that is at a predetermined distance from itself and that is blocked by the virtual obstacle. This, in turn, facilitates the target virtual operation object to quickly find the target virtual prop, thereby resolving the technical problem that the target virtual operation object takes a relatively long time to find the target virtual prop in the related art.

In some embodiments, the target virtual prop is displayed in the target application in response to the target virtual prop of the target type being detected within the visual angle range of the target virtual operation object, the distance between the target virtual operation object and the target virtual prop is less than the predetermined threshold, and no virtual obstacle exists between the target virtual operation object and the target virtual prop. In other words, in event that the target virtual prop at a distance less than the predetermined threshold from itself is detected within the visual angle range of the target virtual operation object, no virtual obstacle existing between the target virtual operation object and the target virtual prop indicates that the target virtual operation object can directly see the target virtual prop, and in this case, the target virtual prop can be normally displayed in the target application.

In some embodiments, the displaying perspective information of a target virtual prop in a target application includes: displaying the perspective information of the target virtual prop on a virtual obstacle that is closest to the target virtual operation object among target virtual obstacles in the target application. As shown in FIG. 3, a wall 301 is the virtual obstacle that is closest to the target virtual operation object, and therefore, perspective information of a contour of a helicopter is displayed on the wall 301.

In some embodiments, before the detecting a virtual prop of a target type within a visual angle range of the target virtual operation object, the method further includes:
 displaying an identifier of the target virtual skill in the target application;
 obtaining a touch operation performed on the identifier of the target virtual skill; and
 configuring the target virtual skill to the target virtual operation object in response to the touch operation.

The displaying an identifier of the target virtual skill in the target application includes:
 displaying identifiers of a group of virtual skills in the target application, where the identifiers of the group of virtual skills include the identifier of the target virtual skill, each virtual skill in the group of virtual skills is set to allow configuration to only one virtual operation object in a virtual operation object set, the virtual operation object set includes the target virtual operation object, and the virtual operation object set includes virtual operation objects participating in a combat run by the target application. In other words, different virtual operation objects belong to the same group own different virtual skills, so as to avoid a plurality of virtual operation objects belonging to a group having the same virtual skill at the same time, thereby increasing the fun of the game.

Figure 4:
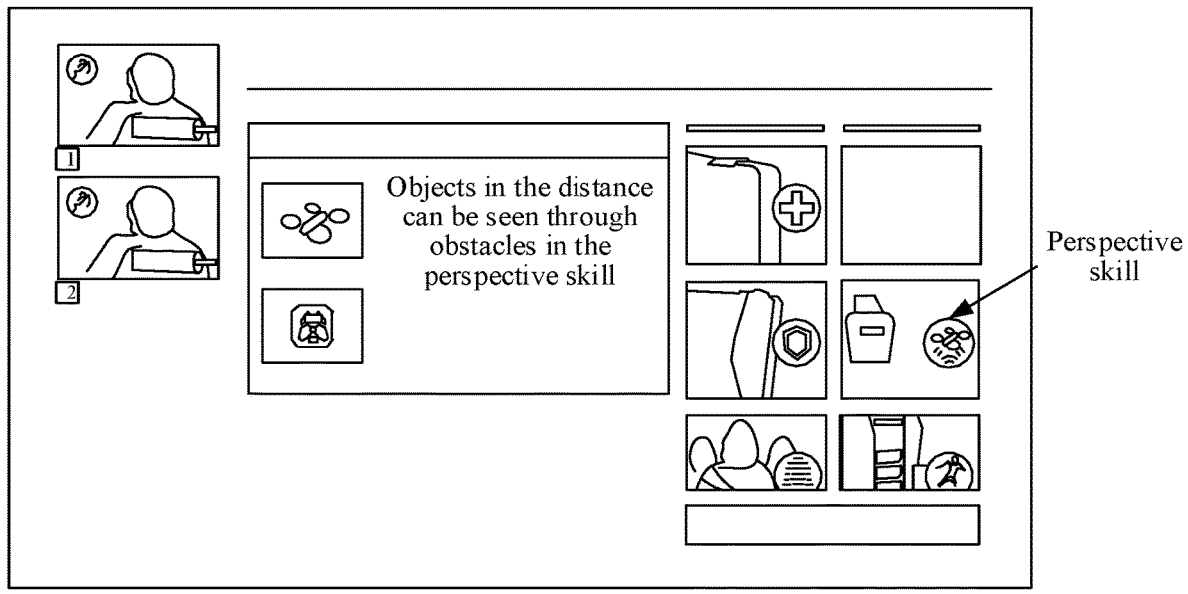
FIG. 4 is a virtual skill display interface according to an embodiment of this application.

For example, a group of four virtual operation objects in a group battle allows only one of the four virtual operation objects to own the virtual skill. Identifiers (icons) of various virtual skills are presented in a virtual skill display interface shown in FIG. 4, and a player can select a virtual skill corresponding to an icon for a virtual operation object.

The displaying an identifier of the target virtual skill in the target application includes:
 displaying the identifier of the target virtual skill in a predetermined time period after the target application starts running a combat; or
 displaying the identifier of the target virtual skill on a preparation interface before the target application starts running a combat.

In some embodiments, the detecting a virtual prop of a target type within a visual angle range of the target virtual operation object includes: detecting a virtual vehicle within the visual angle range of the target virtual operation object; and the displaying perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop includes: displaying perspective information of the target virtual vehicle in the target application in response to a target virtual vehicle being detected within the visual angle range of the target virtual operation object, a distance between the target virtual operation object and the target virtual vehicle is less than the predetermined threshold, and at least one target virtual obstacle exists between the target virtual operation object and the target virtual vehicle.

Figure 5:
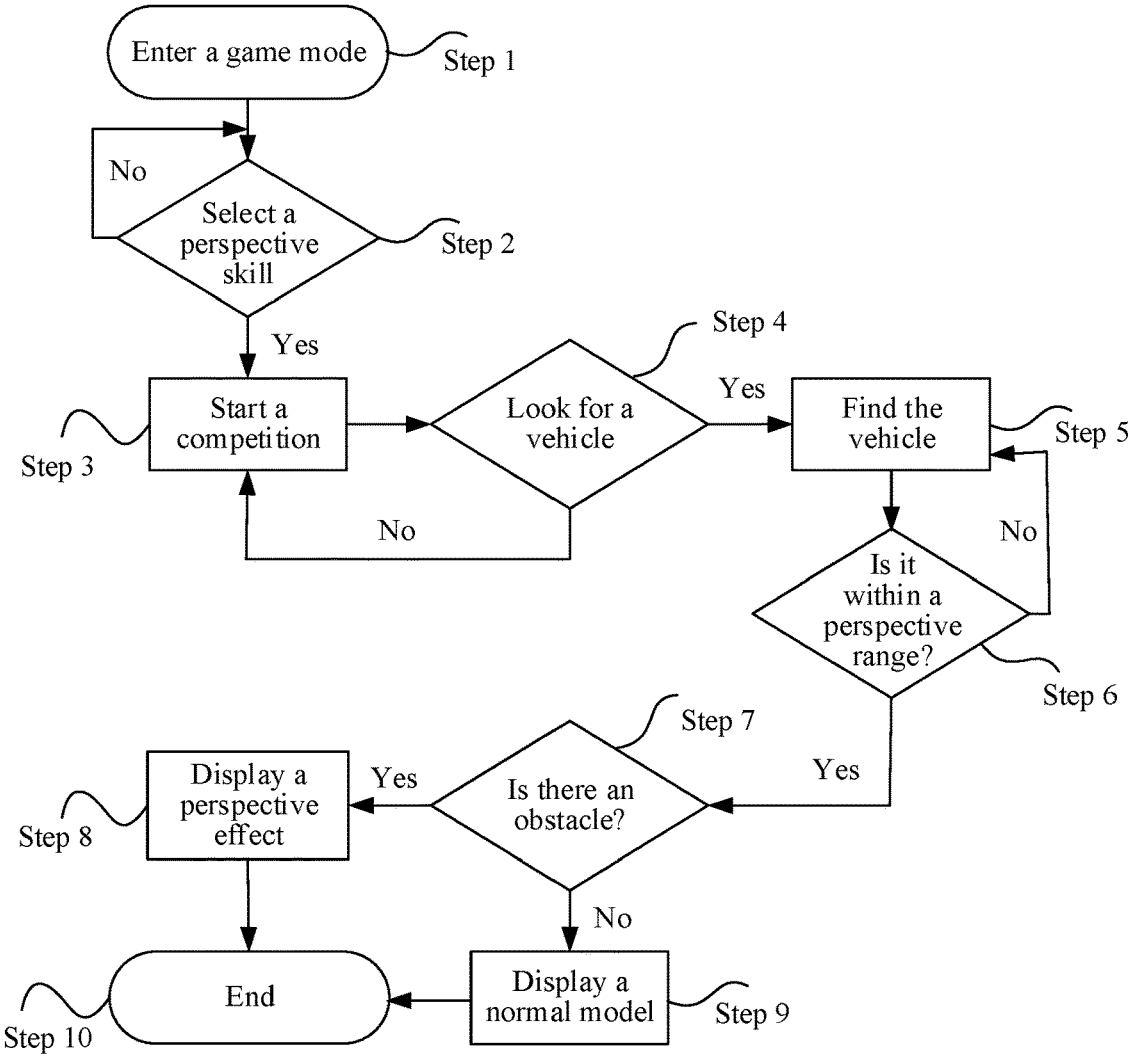
FIG. 5 is a flowchart of a method for seeing through an obstacle in a shooting game according to an embodiment of this application.

The embodiments of this application further provide a method for seeing through an obstacle in a shooting game. FIG. 5 is a flowchart of a method for seeing through an obstacle in a shooting game according to an embodiment of this application. As shown in FIG. 5, the process includes:

Step 1: Start to enter the game.

In step 1, a player opens a target application running on a terminal.

Step 2: Determine whether to select a perspective function, if yes, perform step 3, and if no, go back to step 1.

After the player enters the target application, there is a countdown period before the official start of the game operation, during which the player needs to select a perspective skill (or a skill chip) quickly; otherwise, the perspective skill cannot be selected when selected by a teammate. In other words, the perspective skill can only allow to be selected by one player in the same team.

The perspective skill may include, but is not limited to, helping players find vehicles, shooting props and the like more easily. Further, it is convenient for players to obtain the place where the vehicle or shooting prop exists, and further achieve quick access to the vehicle or the shooting prop.

Step 3: Start the competition.

After selecting the perspective skill, the player can officially enter the game and the competition begins.

Step 4: Look for a vehicle.

Because there is a relatively large game map in the game, sometimes the player needs a vehicle to reach the destination quickly, and therefore the player looks for a vehicle.

Step 5: Find the vehicle.

Figure 6:
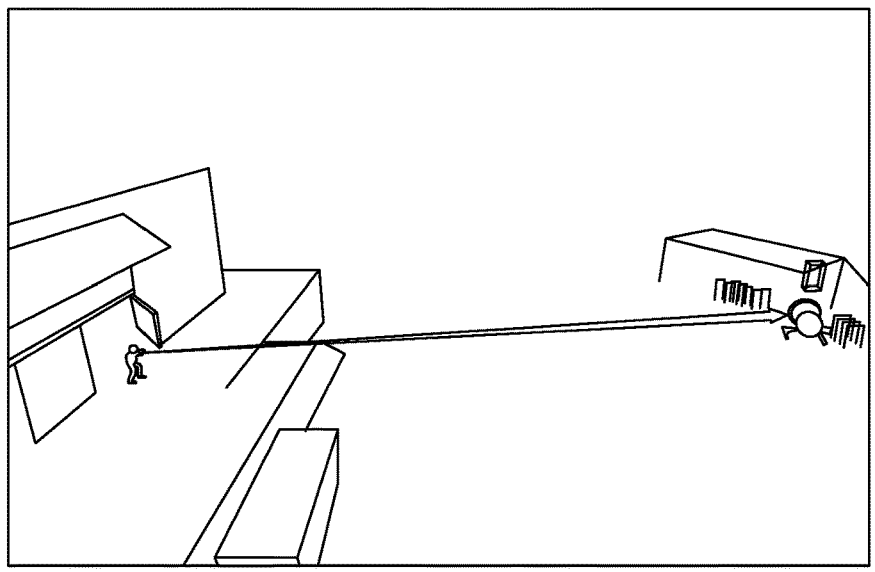
FIG. 6 is a schematic principle diagram of a vehicle perspective effect according to an embodiment of this application.

Step 6: Determine whether the vehicle is within a perspective range, if yes, perform step 7, and if no, perform step 5;

Each time the player obtains all vehicles within the current visual angle range, the player performs further filtering: first selecting vehicles that meet the perspective range. The filtering manner may be drawing a ray from the vehicles within the current visual angle to the player, and the returned information may include the distances and whether there are obstacles in between. FIG. 6 is a schematic principle diagram of a vehicle perspective effect, and in this manner, all vehicles that meet the perspective effect can be obtained.

Step 7: Determine whether an obstacle exists between the vehicle and the virtual operation object, if yes, perform step 8, and if no, perform step 9.

The virtual operation object is controlled by the player.

Step 8: Generate a perspective effect.

Step 9: Display a normal model.

In a case that a perspective vehicle is obtained, all pixels of the vehicle are obtained, and then these points are depicted as white dots displayed in front of the player's visual angle. These are rendering layer techniques. The rendering layer can calculate all physical objects within the visual angle range, and the application layer can obtain whether each pixel is in the top layer, and if yes, there is no perspective effect, if not, it means that there is an obstacle in the way, and the pixel is depicted as white, so that the blocked vehicle part is displayed perspectively, and the unblocked part is displayed normally.

Step 10: End.

Through the solution of the embodiments of the present application, it is possible to see through perspective vehicles within a certain range, and the player with the perspective function can see vehicles within a certain range through obstacles, so that if the player is looking for a vehicle, the player can immediately learn the direction of the vehicle in this way, and is not aimless. This solution makes the game easier for the player and increases the fun of the game.

For the ease of description, the foregoing method embodiments are expressed as a series of action combinations, but a person skilled in the art is to learn that because some steps may be performed in other sequences or simultaneously according to the embodiments of this application, the embodiments of this application are not limited to the described action sequence. In addition, a person skilled in the art is to also learn that the embodiments described in this specification are all preferred embodiments; and therefore, an action and a module involved are not necessarily mandatory in the embodiments of this application.

Figure 7:
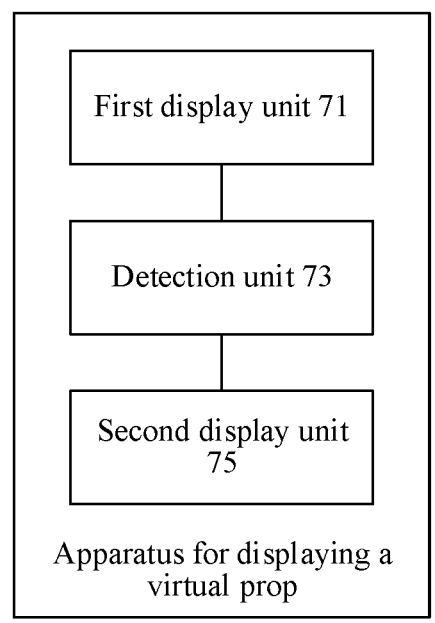
FIG. 7 is a schematic structural diagram of an apparatus for displaying a virtual prop according to an embodiment of this application.

According to another aspect of the embodiments of this application, an apparatus for displaying a virtual prop configured to implement the foregoing method for displaying a virtual prop is further provided. Referring to FIG. 7, the apparatus includes: a first display unit 71, a detection unit 73, and a second display unit 75.

The first display unit 71 is configured to display a screen in which a target virtual operation object is located in a target application.

The detection unit 73 is configured to detect a virtual prop of a target type within a visual angle range of the target virtual operation object in response to the target virtual operation object being configured with a target virtual skill, where the target virtual skill is used for allowing the target virtual operation object to see the virtual prop of the target type through a virtual obstacle.

The second display unit 75 is configured to display perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop.

In some embodiments, the second display unit 75 may include: a first display module, configured to display the perspective information of the target virtual prop in the target application in response to the target virtual prop of the target type being detected within the visual angle range of the target virtual operation object, the distance between the target virtual operation object and the target virtual prop is less than the predetermined threshold, and a plurality of virtual obstacles exist between the target virtual operation object and the target virtual prop, where the at least one target virtual obstacle includes the plurality of virtual obstacles.

In some embodiments, the second display unit 75 may further include:

a second display module, configured to display a contour of the target virtual prop in the target application, where the perspective information includes the contour of the target virtual prop, and a dimension of the contour being negatively correlated with the distance.

In some embodiments, the second display unit 75 may further include:

a third display module, configured to display the perspective information of the target virtual prop on a virtual obstacle that is closest to the target virtual operation object among the target virtual obstacles in the target application.

Through the embodiments provided by this application, the first display unit 71 displays a screen in which a target virtual operation object is located in a target application; the detection unit 73 detects a virtual prop of a target type within a visual angle range of the target virtual operation object in response to the target virtual operation object being configured with a target virtual skill, where the target virtual skill is used for allowing the target virtual operation object to see the virtual prop of the target type through a virtual obstacle; and the second display unit 75 displays perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop, to avoid a failure in seeing the target virtual prop behind the virtual obstacle in time due to the blocking of the virtual obstacle, so that the target virtual operation object can perspectively see the target virtual prop that is at a predetermined distance from itself and that is blocked by the virtual obstacle. This, in turn, facilitates the target virtual operation object to quickly find the target virtual prop, thereby resolving the technical problem that the target virtual operation object takes a relatively long time to find the target virtual prop in the related art.

In some embodiments, the apparatus may further include:

a third display unit, configured to display the target virtual prop in the target application in response to the target virtual prop of the target type being detected within the visual angle range of the target virtual operation object, the distance between the target virtual operation object and the target virtual prop is less than the predetermined threshold, and no virtual obstacle exists between the target virtual operation object and the target virtual prop.

In some embodiments, the apparatus may further include:

a fourth display unit, configured to display an identifier of a target virtual skill in a target application before the virtual prop of the target type is detected within the visual angle range of the target virtual operation object;

an obtaining unit, configured to obtain a touch operation performed on the identifier of the target virtual skill; and a configuration unit, configured to configure the target virtual skill to the target virtual operation object in response to the touch operation.

The fourth display unit includes:

a fourth display module, configured to display identifiers of a group of virtual skills in the target application, where the identifiers of the group of virtual skills includes the identifier of the target virtual skill, each virtual skill in the group of virtual skills is set to allow configuration to only one virtual operation object in a virtual operation object set, the virtual operation object set includes the target virtual operation object, and the virtual operation object set include virtual operation objects participating in a combat run by the target application.

The fourth display unit may further include:

a fifth display module, configured to display the identifier of the target virtual skill in a predetermined time period after the target application starts running a combat; or a sixth display module, configured to display the identifier of the target virtual skill on a preparation interface before the target application starts running a combat.

In some embodiments, the apparatus may further include:

a detection unit, including a detection module, configured to detect a virtual vehicle within the visual angle range of the target virtual operation object; and a second display unit, including a seventh display module, configured to display perspective information of the target virtual vehicle in the target application in response to a target virtual vehicle being detected within the visual angle range of the target virtual operation object, a distance between the target virtual operation object and the target virtual vehicle is less than a predetermined threshold, and at least one target virtual obstacle exists between the target virtual operation object and the target virtual vehicle.

Figure 8:
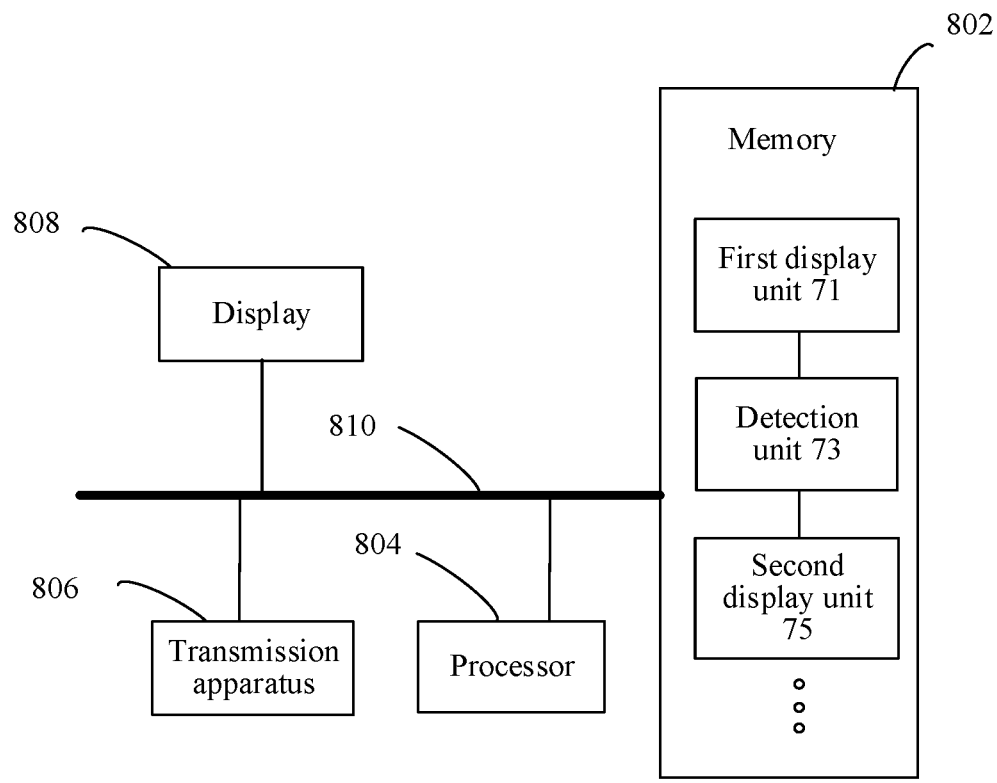
FIG. 8 is a schematic structural diagram of an electronic device of a method for displaying a virtual prop according to an embodiment of this application.

According to still another aspect of the embodiments of this application, an electronic device configured to implement the foregoing method for displaying a virtual prop is further provided. As shown in FIG. 8, the electronic device includes a memory 802 and a processor 804. The memory 802 stores a computer program, and the processor 804 is configured to perform the steps in any one of the foregoing method embodiments through the computer program.

In this embodiment, the electronic device may be located in at least one of a plurality of network devices in a computer network, for example, a server.

In this embodiment, the processor may be configured to perform the following steps through the computer program:

S1: Display a screen in which a target virtual operation object is located in a target application.

S2: Detect a virtual prop of a target type within a visual angle range of a target virtual operation object in response to a target virtual operation object being configured with a target virtual skill, where the target virtual skill allows the target virtual operation object to see the virtual prop of the target type through a virtual obstacle.

S3: Display perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop.

A person of ordinary skill in the art may understand that, the structure shown in FIG. 8 is only schematic. The electronic device may be a terminal device such as a smartphone (such as an Android mobile phone or an iOS mobile phone), a tablet computer, a palmtop computer, a mobile Internet device (MID), or a PAD. FIG. 8 does not constitute a limitation on the structure of the electronic device. For example, the electronic device may further include more or fewer components (such as a network interface) than those shown in FIG. 8, or have a configuration different from that shown in FIG. 8.

The memory 802 may be configured to store a software program and a module, for example, a program instruction/module corresponding to the method and the apparatus for displaying a virtual prop in the embodiments of this application. The processor 804 runs the software program and the module stored in the memory 802, to perform various functional applications and data processing, that is, implement the foregoing method for displaying a virtual prop. The memory 802 may include a high-speed random memory, and may also include a non-volatile memory, for example, one or more magnetic storage apparatuses, a flash memory, or another non-volatile solid-state memory. In some embodiments, the memory 802 may further include memories remotely disposed relative to the processor 804, and the remote memories may be connected to a terminal through a network. Examples of the network include, but are not limited to, the Internet, an intranet, a local area network, a mobile communication network, and a combination thereof. The memory 802 may be, but is not limited to, configured to store information such as attribute information of the target virtual operation object, attribute information of the virtual obstacle, and attribute information of target virtual prop. As an example, as shown in FIG. 8, the memory 802 may include, but is not limited to, a first control unit 71, a first display unit 73, and a second display unit 75 in the foregoing apparatus for displaying a virtual prop. In addition, the memory may further include, but is not limited to, other module units in the foregoing apparatus for displaying a virtual prop. This is not described in detail in this example.

In some embodiments, a transmission apparatus 806 is configured to receive or transmit data through a network. A specific example of the network may include a wired network and a wireless network. In an example, the transmission apparatus 806 includes a network interface controller (NIC), which may be connected to another network device and a router through a network cable, to communicate with the Internet or a local area network. In an example, the transmission apparatus 806 is a radio frequency (RF) module, which communicates with the Internet in a wireless manner.

In addition, the electronic device further includes: a display 808, configured to display perspective information of the target virtual prop; and a connection bus 810, configured to connect the module components in the electronic device.

According to yet another aspect of the embodiments of this application, a computer-readable storage medium is further provided. The computer-readable storage medium stores a computer program, the computer program being configured to perform, when run, the steps in any one of the foregoing method embodiments.

In this embodiment, the computer-readable storage medium may be configured to store a computer program for performing the following steps:

S1: Display a screen in which a target virtual operation object is located in a target application.

S2: Detect a virtual prop of a target type within a visual angle range of the target virtual operation object in response to the target virtual operation object being configured with a target virtual skill, where the target virtual skill allows the target virtual operation object to see the virtual prop of the target type through a virtual obstacle.

S3: Display perspective information of the target virtual prop in the target application in response to the target virtual prop of the target type being detected within the visual angle range of the target virtual operation object, a distance between the target virtual operation object and the target virtual prop is less than a predetermined threshold, and at least one target virtual obstacle exists between the target virtual operation object and the target virtual prop.

In this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

The sequence numbers of the foregoing embodiments of this application are merely for description purpose, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described foregoing are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

The foregoing descriptions are merely exemplary implementations of this application. A person of ordinary skill in the art may make several improvements and modifications without departing from the principle of this application, and the improvements and modifications shall fall within the protection scope of this application.

What is claimed is:

1. A method for displaying a virtual prop, applicable to an electronic device, the method comprising:
displaying a screen in which a target virtual operation object is located in a target application, wherein the target virtual operation object comprises a target virtual character having an ability within the target application to visually see a plurality of other virtual objects also located in the target application;

determining to display a contour of a target virtual prop of a target type overlaid with at least one target virtual obstacle in response to detecting that: the target virtual prop is within a visual angle range of the target virtual operation object and the at least one target virtual obstacle exists between the target virtual operation object and the target virtual prop, wherein the target virtual operation object is configured with a target virtual skill, the target virtual skill allowing the target virtual operation object to see the virtual prop of the target type through a virtual obstacle; and in response to the determining, displaying the contour of the target virtual prop overlaid with the at least one target virtual obstacle in the target application, wherein the displaying the contour of the target virtual prop overlaid with the at least one target virtual obstacle comprises:

displaying the contour according to a ratio of a dimension of the contour to a dimension of a solid model of the target virtual prop such that a value of the ratio increases as a distance between the target virtual operation object and the target virtual prop decreases.

2. The method according to claim 1,
the at least one target virtual obstacle comprises a plurality of virtual obstacles.

3. The method according to claim 1, wherein the target virtual prop comprises a first target virtual prop, the method further comprising:

displaying a second target virtual prop in the target application in response to: the second target virtual prop being detected within the visual angle range of the target virtual operation object and no virtual obstacle existing between the target virtual operation object and the second target virtual prop.

4. The method according to claim 1, wherein the displaying contour of the target virtual prop in the target application comprises:

displaying the contour of the target virtual prop on a virtual obstacle that is closest to the target virtual operation object among the target virtual obstacles in the target application.

5. The method according to claim 1, wherein before the detecting that a virtual prop is within a visual angle range of the target virtual operation object, the method further comprises:

displaying an identifier of the target virtual skill in the target application;

obtaining a touch operation performed on the identifier of the target virtual skill; and configuring the target virtual skill to the target virtual operation object in response to the touch operation.

6. The method according to claim 5, wherein the displaying an identifier of the target virtual skill in the target application comprises:

displaying identifiers of a group of virtual skills in the target application, the identifiers of the group of virtual skills comprising the identifier of the target virtual skill, each virtual skill in the group of virtual skills being set to allow configuration to only one virtual operation object in a virtual operation object set, the virtual operation object set comprising the target virtual operation object, and the virtual operation object set comprising virtual operation objects participating in a combat run by the target application.

7. The method according to claim 5, wherein the displaying an identifier of the target virtual skill in the target application comprises:

displaying the identifier of the target virtual skill in a predetermined time period after the target application starts running a combat; or displaying the identifier of the target virtual skill on a preparation interface before the target application starts running a combat.

8. The method according to claim 1, wherein the target virtual prop comprises a target virtual vehicle.

9. An apparatus for displaying a virtual prop, comprising:
a memory storing a plurality of instructions; and
a processor configured to execute the plurality of instructions, and upon execution of the plurality of instructions, is configured to:

display, with a display, a screen in which a target virtual operation object is located in a target application, wherein the target virtual operation object comprises a target virtual character having an ability within the target application to visually see a plurality of other virtual objects also located in the target application;

determine to display a contour of a target virtual prop of a target type overlaid with at least one target virtual obstacle in response to a detection that: the target virtual prop is within a visual angle range of the target virtual operation object and the at least one target virtual obstacle exists between the target virtual operation object and the target virtual prop, wherein the target virtual operation object is configured with a target virtual skill, the target virtual skill allowing the target virtual operation object to see the virtual prop of the target type through a virtual obstacle; and in response to the determination, display, with the display, the contour of the target virtual prop overlaid with the at least one target virtual obstacle in the target application, wherein in order to display the contour of the target virtual prop overlaid with the at least one target virtual obstacle, the processor, upon execution of the plurality of instructions, is configured to:

display the contour according to a ratio of a dimension of the contour to a dimension of a solid model of the target virtual prop such that a value of the ratio increases as a distance between the target virtual operation object and the target virtual prop decreases.

10. The apparatus according to claim 9, wherein the at least one target virtual obstacle comprises a plurality of virtual obstacles.

11. The apparatus according to claim 9, wherein the target virtual prop comprises a first target virtual prop, and wherein the processor, upon execution of the plurality of instructions, is further configured to:

display a second target virtual prop in the target application in response: to the target second virtual prop being detected within the visual angle range of the target virtual operation object and no virtual obstacle existing between the target virtual operation object and the second target virtual prop.

12. The apparatus according to claim 9, wherein in order to display the contour of the target virtual prop in the target application, the processor, upon execution of the plurality of instructions, is configured to: display the contour of the target virtual prop on a virtual obstacle that is closest to the target virtual operation object among the target virtual obstacles in the target application.

13. The apparatus according to claim 9, wherein the processor, upon execution of the plurality of the plurality of instructions, is further configured to:
before detection of the virtual prop of the target type within the visual angle range of the target virtual operation object:
display an identifier of the target virtual skill in the target application;
obtain a touch operation performed on the identifier of the target virtual skill; and
configure the target virtual skill to the target virtual operation object in response to the touch operation.

14. A non-transitory computer readable storage medium storing a plurality of instructions executable by a processor, the plurality of instructions, upon execution by the processor, is configured to cause the processor to:
display, with a display, a screen in which a target virtual operation object is located in a target application, wherein the target virtual operation object comprises a target virtual character having an ability within the target application to visually see a plurality of other virtual objects also located in the target application;
determine to display a contour of a target virtual prop of a target type overlaid with at least one target virtual obstacle in response to a detection that: the target virtual prop is within a visual angle range of the target virtual operation object and the at least one target virtual obstacle exists between the target virtual operation object and the target virtual prop, wherein the target virtual operation object is configured with a target virtual skill, the target virtual skill allowing the target virtual operation object to see the virtual prop of the target type through a virtual obstacle; and
in response to the determination, display, with the display, the contour of the target virtual prop overlaid with the at least one target virtual obstacle in the target application, wherein in order to display the contour of the target virtual prop overlaid with the at least one target virtual obstacle, the processor, upon execution of the plurality of instructions, is configured to:
display the contour according to a ratio of a dimension of the contour to a dimension of a solid model of the target virtual prop such that a value of the ratio increases as a distance between the target virtual operation object and the target virtual prop decreases.

15. The non-transitory computer readable storage medium according to claim 14, wherein the at least one target virtual obstacle comprises a plurality of virtual obstacles.

16. The non-transitory computer readable storage medium according to claim 14, wherein the target virtual prop comprises a first target virtual prop, and wherein the plurality of instructions, upon execution by the processor, is further configured to cause the processor to:
display the target virtual prop in the target application in response to: a second target virtual prop being detected within the visual angle range of the target virtual operation object and no virtual obstacle existing between the target virtual operation object and the second target virtual prop.

17. The non-transitory computer readable storage medium according to claim 14, wherein the plurality of instructions, in order to cause the processor to display the contour of the target virtual prop in the target application, upon execution by the processor, is configured to cause the processor to: display the contour of the target virtual prop on a virtual obstacle that is closest to the target virtual operation object among the target virtual obstacles in the target application.

* * * * *